United States Patent [19]

Sato et al.

[11] Patent Number: 5,083,156
[45] Date of Patent: Jan. 21, 1992

[54] VACUUM CONTACT PRINTING DEVICE AND EXPOSURE APPARATUS AND ORIGINAL CONTACT DEVICE

[75] Inventors: Toshiyuki Sato; Hiroyuki Hashimoto; Kazuo Watanabe, all of Tokyo, Japan

[73] Assignee: Dai Nippon Insatsu Kabushiki Kaisha, Japan

[21] Appl. No.: 666,081

[22] Filed: Mar. 7, 1991

[30] Foreign Application Priority Data

Mar. 16, 1990 [JP] Japan .................. 2-65603
Mar. 16, 1990 [JP] Japan .................. 2-65604
Mar. 16, 1990 [JP] Japan .................. 2-65605

[51] Int. Cl.⁵ .............................. G03B 27/20
[52] U.S. Cl. .............................. 355/91; 355/99; 355/114
[58] Field of Search ............ 355/26, 91, 99, 114

[56] References Cited

U.S. PATENT DOCUMENTS

| | | | |
|---|---|---|---|
| 601,882 | 4/1898 | Schwarz | 355/114 |
| 3,531,198 | 9/1970 | Delp | 355/26 |
| 3,622,241 | 11/1971 | Dexter | 355/91 X |
| 3,689,153 | 9/1972 | Suzuki | 355/91 X |
| 4,721,980 | 1/1988 | Yazaki | 355/26 |
| 4,764,791 | 8/1988 | Omata et al. | 355/99 X |
| 4,827,316 | 5/1989 | Brown | 355/91 X |

*Primary Examiner*—Richard A. Wintercorn
*Attorney, Agent, or Firm*—Parkhurst, Wendel & Rossi

[57] ABSTRACT

A vacuum contact printing device comprises a pair of frame members for supporting a pair of originals disposed on both sides of a base member and a pair of transparent plates disposed outside the frame members. A first vacuum chamber is formed between the paired originals and a second vacuum chambers are formed between the paired originals and the transparent plates. A vacuum device is connected to the first and second vacuum chambers for exhausting inner air in the first and second chambers for reducing inner pressures thereof and being capable of releasing the vacuum condition at least in the second vacuum chamber. There is provided an exposure apparatus to which the original contact printing device is applicable, in which original contact devices are movable from exposure positions to other positions and a supplemental original contact device is movable to the exposure position. The original contact device includes a first slide mechanism for supporting a first frame member so as to be movable in a direction normal to the base member and a second slide mechanism supported by the first frame member for supporting a second frame member so as to be movable in a direction normal to the base member.

22 Claims, 14 Drawing Sheets

VACUUM CONTACT PRINTING DEVICE AND EXPOSURE APPARATUS AND ORIGINAL CONTACT DEVICE

BACKGROUND OF THE INVENTION

The present invention relates to a vacuum contact printing device for carrying out a printing operation in which an original is closely contacted through vacuum operation to both surfaces of a base material to be exposed and, also to an exposure apparatus and an original contact device.

Generally, in a case where a picture pattern described on a transparent original such as film or glass plate, called merely an original hereinlater, is transferred to an exposure material by utilizing a contact printing method, a vacuum contact printing method has been utilized as a high precision transferring method as disclosed, for example, in Japanese Patent Laid-open Publication No. 58-136026).

FIG. 14 shows one example of a contact printing device utilizing the vacuum contact printing method of the prior art. The contact printing device comprises a pair of frame members 3 and 3 secured by a vacuum chuck, not shown, so as to arrange originals 2 and 2 made of such as glass plate on both sides of a photosensitive base member 1, packings 4 and 4 attached to opposing surfaces of the frame members 3 and 3, a vacuum pump connected to an exhaust port 5 formed one of the frame members, a bed 6 supporting the frame members 3 and 3 in a reciprocally movable manner so as to approach or separate from the frame members with each other, and lighting sources 7 and 7 disposed on both sides of the photosensitive base member 1.

A printing method utilizing the contact printing device of the character described above is carried out in the following manner.

The photosensitive base member 1 is first positioned at a predetermined position between originals 2 and 2 and, after the positioning thereof, a pair of frame members 3 and 3 are moved in directions towards the photosensitive base member 1 to thereby clamp both the surfaces of the base member 1 by the originals 2 and 2 to seal the space between the frame members 3 and 3 by the packings 4 and 4, whereby a sealed vacuum chamber 8 is defined by the originals 2 and 2, the frame members 3 and 3 and the packings 4 and 4. The exhaust port 5 is communicated with the vacuum chamber 8 and inner air in the chamber 8 is sucked by the vacuum pump through the exhaust port 5 to create the vacuum condition in the vacuum chamber 8. As a result, as shown in FIG. 15, both the originals 2 and 2 are pressed by the atmosphere to closely contact to the photosensitive base member 1. The lighting sources 7 and 7 are then lit to print the picture pattern described on the originals 2 and 2 on the photosensitive base member 1.

However, with the conventional printing device, in case of utilizing a photosensitive base member having a large area such as shadow mask for a Braun tube and an original having a large size, there has been often caused a problem of generating vacuum contact defective portions 9 as shown in FIG. 16. Such defective portions 9 are locally generated particularly at portions near the central portion of the photosensitive base member. This adverse phenomenon is discriminated by the observation of a viewer of an interference fringe, called Newton ring, or confirmation of a transferred condition of the photosensitive base member after the picture pattern transferring process. Such defects result from the fact that, when the interia of the vacuum chamber is sucked and the pressure reduced through the exhaust port, the outer peripheral portion of the original or the photosensitive base member is quickly sucked and, hence, air is sealed at a portion near the central portion thereof, such air being hardly sucked. There is no way other than a way in which such sealed air is drawn out from the closely contacted portion of the outer periphery of the original or the base member by taking a relatively long time. Accordingly, in a case where the original and the photosensitive base member each having a large size and having good smoothness are utilized, it is extremely difficult to suck and draw out the sealed air after the outer peripheral portions of the original and the base member are once closely contacted, requiring much time, for example, several or several tens of minutes, thus resulting in a significant problem for the productivity of the device.

In order to obviate the described defects of the conventional device, much care has been paid to the original or photosensitive base member for shortening the sucking and close contacting time. For example, the contact surface of the original or base member is made finely coarse to the extent of causing no problem for the exposure. According to this method, the coarse surface portion forms a minute gap at the close contacting time and the interior air in the vacuum chamber can be sucked through the minute gap. The sucking time is reduced in accordance with the extent of the coarseness. However, in this method, a process for making coarse the surface of the original or base member is additionally required, causing another problem.

SUMMARY OF THE INVENTION

An object of the present invention is to substantially eliminate defects and drawbacks encountered in the prior art described and to provide a vacuum contact printing device and an exposure apparatus and an original contact device both utilizing the vacuum contact printing device for achieving good close contact condition in a short time of originals to a photosensitive base member without requiring processing such as surface coarse working to the originals and the base member.

Another object of the present invention is to provide a vacuum printing method for achieving an improved original contact printing condition by utilizing the vacuum contact printing device.

These and other objects can be achieved according to the present invention by providing, in one aspect, a vacuum contact printing device comprising a pair of frame members which support originals at both sides of a base member having both surfaces coated with a photosensitive material and which define a first vacuum chamber between the originals, transparent plate members supported by the frame members and disposed so as to define second vacuum chambers each between the transparent plate member and the original on both sides of the base member, a vacuum device for exhausting air in the first and second vacuum chambers to substantially reduce inner pressure thereof and releasing a vacuum condition at least in the second vacuum chamber and an exposure lighting source arranged outside the plate members for irradiating an exposure light.

In another aspect of the present invention, there is provided an exposure apparatus comprising a transferring device for transferring an elongated base member having both surfaces coated with a photosensitive material through a predetermined exposure position, a plurality of original contact devices arranged along a transferring path of the base member so as to closely contact originals on which picture patterns are described to both surfaces of the base member, an exposure lighting source disposed outside the originals, and a supplemental original contact device arranged at a portion apart from the exposure position, the original contacts each being constructed to be movable from the exposure position to another position and the supplemental original contact device being constructed so as to be movable to the exposure position from another position.

In a further aspect of the present invention, there is provided an original contact device comprising a first frame member disposed on one side of a base member having both surfaces coated with a photosensitive material for supporting a first original, a first slide mechanism for supporting the first frame member to be movable in a direction normal to the base member, a second frame member disposed on another side of the base member for supporting a second original, and a second slide mechanism supported by the first frame member for supporting the second frame member to be movable in a direction normal to the base member.

In a still further aspect of the present invention, there is provided a vacuum printing method comprising the steps of preparing a base member having both surfaces coated with a photosensitive material and a pair of originals, arranging the originals on both sides of the base member so as to define a first vacuum chamber between the base member and the originals, arranging a pair of transparent plates outside the originals so as to define second vacuum chambers between the originals and the transparent plates, exhausting air inside the first and second vacuum chambers to reduce the inner pressure thereof, releasing a vacuum condition only in the second vacuum chamber to closely contact the originals to the base member, and irradiating an exposure light towards the transparent plates from outside the same.

According to the present invention of the character described above, the originals can be closely contacted to the base member in a desired condition in an extremely short time. The location of the supplemental original contact device in addition to the original contact device in the exposure apparatus can significantly shorten the original exchanging time without adversely influencing the positional accuracy of the original contact device. The relative positioning of the respective originals can be effectively performed. Thus, the original printing operation can be itself performed under improved conditions and with high accuracy.

DESCRIPTION OF THE PREFERRED EMBODIMENTS

Preferred embodiments according to the present invention will be described hereunder with reference to the accompanying drawings.

Embodiment of Vacuum Contact Printing Device

Basic Construction

Figure 1:
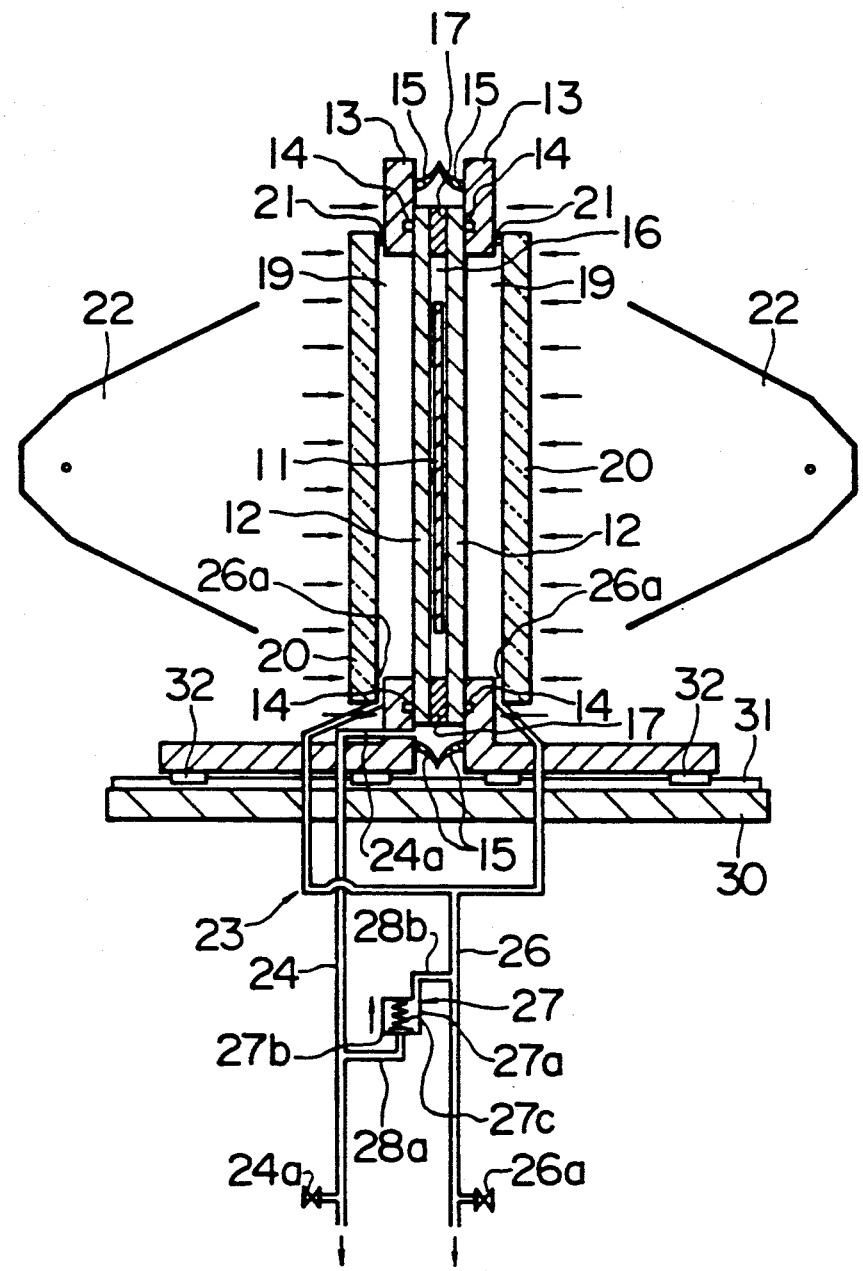
FIG. 1 is a schematic elevational section of one embodiment of a vacuum contact printing device according to the present invention.
Figure 2:
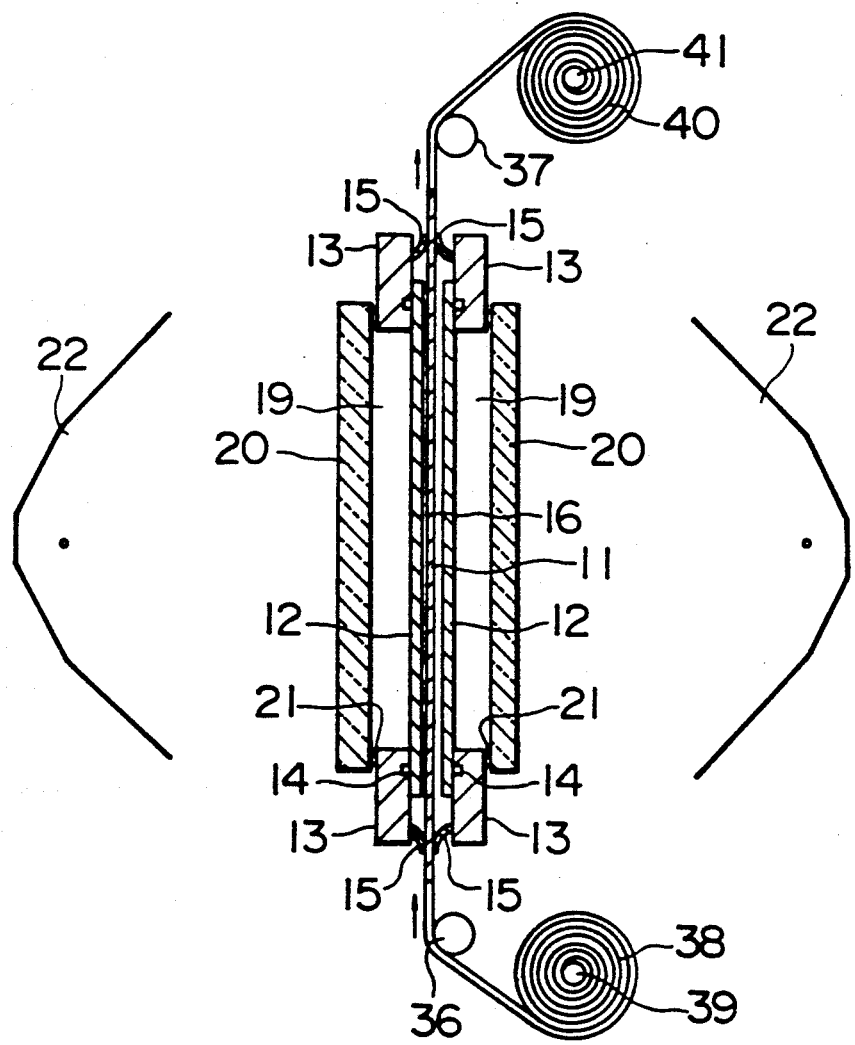
FIG. 2 is a schematic plan view of the vacuum contact printing device shown in FIG. 1.
Figure 3:
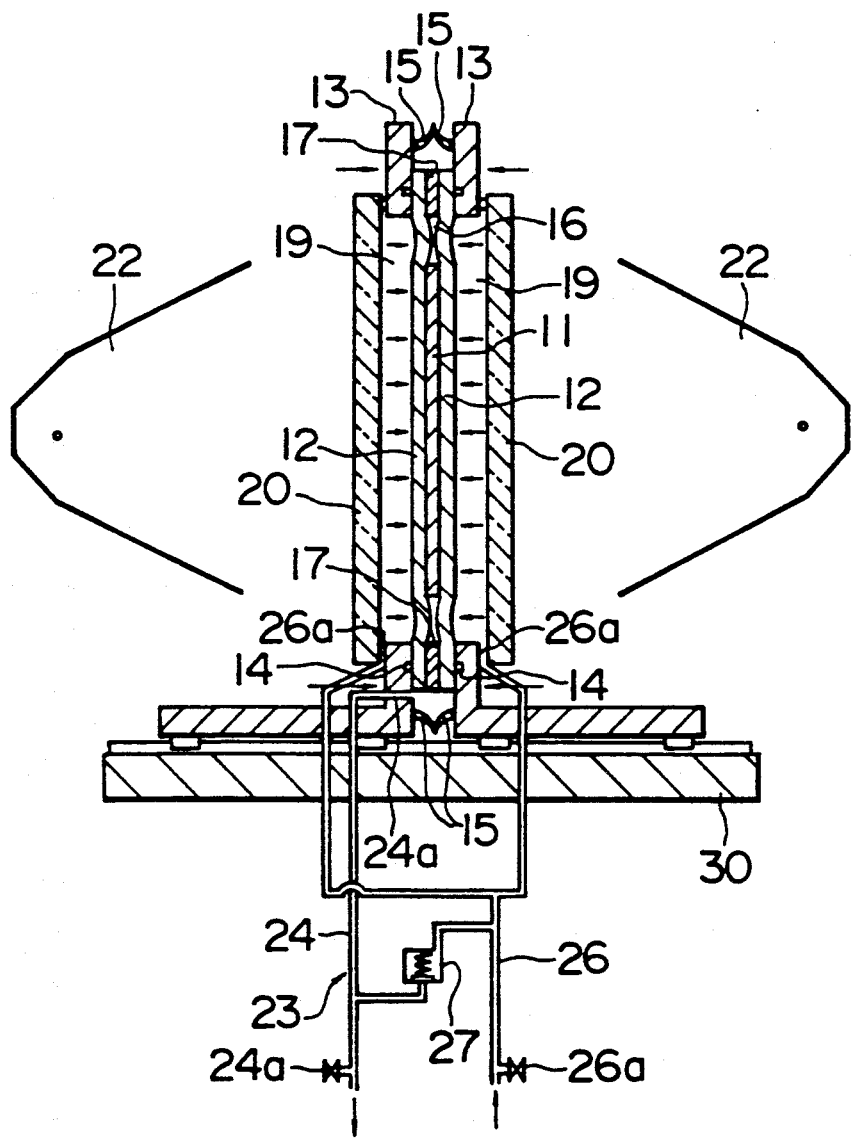
FIG. 3 is a schematic sectional view showing a condition in which originals are closely contacted to a photosensitive base member of the vacuum contact printing device.

First, an embodiment of a vacuum contact printing device according to the present invention will be described with reference to FIGS. 1 and 2, in which a reference numeral 11 denotes a photosensitive base member to be exposed on which a photosensitive material is coated and numeral 12 denotes an original made of a glass plate, for example, on which a predetermined picture pattern to be transferred on the surface of the photosensitive base member 11 is described. For example, the base member 11 is made of steel, metal web. or the like. The originals 12 and 12 are supported to a pair of frame members 13 and 13 in a vacuum sucked manner by means of vacuum sucking grooves 14 and 14. Packings 15 and 15 are attached, on the outside of the originals 12 and 12, to the opposing surfaces of the paired frame members 13 and 13. A first vacuum chamber 16 is defined by these originals 12, the frame members 13 and the packings 15. It is preferred that the packings 15 are made of a soft material. In a case where the packings 15 are made of a hard material, the packings 15 are hard to shrink in a vacuum contacting procedure and hence hard to closely mutually contact to the originals and, furthermore, in this case, there may be caused a case wherein a vacuum leak is caused through a gap formed between a portion at which the photosensitive base member 11 does not contact to the packing 15 as shown in FIG. 1 and a portion at which the base member 11 and the packing 15 contacts as shown in FIG. 2.

A spacer 17 made of such as tape, metal plate or paper is disposed between upper and lower, as viewed, end portions of the originals 12 and 12. The spacer 17 is partially attached to the end surface of the originals 12 and 12, for example, with pitches each of about 20 mm for ensuring an air bleed path. The thickness of the spacer 17 is predetermined so that the thickness is slightly thicker than that of the inserted photosensitive base member 11 and is of the extent such that the originals 12 and 12 are contacted to the photosensitive base member 11 with no substantial gap therebetween by flexing the originals 12 when the originals are pressed by the photosensitive base member 11 by the vacuum contact. The reason for the location of the spacer 17 will be described hereinafter.

On the outside of the frame members 13 and 13 are defined second vacuum chambers 19 and 19, and for this purpose, transparent plates 20 and 20 made of such as glass or resin plates are attached to the frame members 13 and 13 by bolt means or commercially sold one-touch clamp members in parallel to the originals 12 and 12. A packing 21 is also disposed between the frame members 13 and the transparent plates 20 to maintain air sealed condition. The second vacuum chambers 19 and 19 are defined between the originals 12 and 12 and the transparent plates 20 and 20.

Lighting sources 22 and 22 for exposure are disposed further outside the transparent plates 20 and 20, and each of the lighting sources 22 irradiates light for the exposure for printing the picture image on the original 12 to the photosensitive base member 11 through the transparent plate 20. A conventional lighting source may be utilized for this lighting source for the exposure. For example, in a case where a sensitizing agent coated on the photosensitive base member 11 is sensitized by light having a wavelength of about 300 to 500 nm, an ultra-high-pressure mercury lamp for irradiating the exposure light mainly including light having a wavelength area (below about 400 nm) of ultraviolet ray area may be utilized as the lighting source or a metal halide lamp for irradiating the exposure light mainly including light having a long wavelength outside the ultraviolet ray area may be also utilized as the lighting source. In a case where the metal halide lamp is utilized for the lighting source, it will be better to utilize a metal halide lamp enclosing iridium, and when the iridium is enclosed, the light having a wavelength of about 450 nm is generated. The light is not cut by the transparent acrylic plate 20 and suitable for the sensitivity of the photosensitive material.

The transparent plate 20 is composed of a material capable of passing the light for the exposure and, for example, in case of utilizing the ultraviolet ray for the exposure, a glass or resin plate such as acrylic plate having a ultraviolet ray transparent property may be utilized as the transparent plate 20. On the contrary, in case of utilizing the light having a wavelength larger than that of the ultraviolet ray, a material passing the light having such wavelength may be utilized. In view of the strength, it is desired to utilize a resin plate such as acrylic plate other than the glass plate, but the resin plate has generally an ultraviolet ray absorbing property. Accordingly, in the case of utilizing the metal halide lamp irradiating the exposure light including the light having a wavelength larger than that of the ultraviolet ray area, the acrylic resin plate having ultraviolet ray absorbing property can be utilized. The intensity of the exposure lighting source 22 is selected in accordance with the transparent property of the transparent plate 20 and the sensitivity of the photosensitive base member.

To the first and second vacuum chambers 16 and 19 is connected a vacuum device 23 for exhausting the inner air and hence reducing the inner pressure of the vacuum chambers. The vacuum device 23 comprises a first vacuum duct 24 connected to a vacuum port 24a opened to the first vacuum chamber 16, a second vacuum duct 26 connected to a vacuum port 26a opened to each second vacuum chamber 19, and a vacuum source such as vacuum pump connected to the vacuum ducts 24 and 26 respectively through a valve, not shown. The vacuum source acts to absorb the air in the first and second vacuum chambers 16 and 19 to thereby create the vacuum condition therein. The vacuum ducts 24 and 26 are respectively provided with valves 24b and 26b to release the vacuum condition and these ducts 24 and 26 are mutually connected through a check valve 27 and ducts 28a and 28b. The check valve 27 is disposed so as to allow air to flow from the first vacuum chamber 16 towards the second vacuum chambers 19 and 19 but so as to prohibit the reverse flow. The location of the check valve 27 makes it possible to prevent the inner pressure of the second vacuum chambers 19 and 19 from increasing and prevent the original from being damaged by being pressed on the side of the second vacuum chamber 19 even if the inner pressure of the first vacuum chamber 16 is increased by an accidental vacuum leak through the packing 15.

The check valve 27 is composed of a box 27a made of a transparent acryl material connected to the ducts 28a and 28b, an acrylic plate 27b disposed at a portion to close the duct 28a connected to the first vacuum chamber 16, and a spring 27c urging the acrylic plate 27b. In a case where the degree of vacuum in the second chamber 19 is made higher than that in the first vacuum chamber 16, the acrylic plate 27b is forced in an arrowed direction to thereby open the passage, thus equalizing the inner pressures in the first and second vacuum chambers 16 and 19. When the acrylic plate 27b is forced in the arrowed direction, the acrylic plate 27b maintains the position closing the duct 28a till the spring force overcomes the weights of the acrylic plate 27b and, hence, a slight pressure difference may be caused. It is desired that this pressure difference is small as possible so that it is desired for the spring 27c to have a possibly small spring force. The spring 27c having a spring force in accordance with the rigidity of the original 12 may be thus selected.

The paired frame members 13 and 13 are disposed on the bed 30 arranged horizontally to be reciprocally movable. In detail, a rail 31 is attached on the bed 30 and a rail follower 32 secured to each frame member 13 is slidably moved along the rail 31. Furthermore, two ball screws, not shown, corresponding to the respective frame members 13 and 13 are mounted on the bed 30 and screw followers, not shown, engaging with the ball screws respectively are also attached to the frame members 13 and 13. According to this construction, when two ball screws are driven by an electric motor, not shown, the frame members 13 and 13 connected to the screw followers are moved to the closed position as shown in FIG. 1 or 2 and to the bilaterally opened position.

Referring to FIG. 2, at the outsides of both the frame members 13 and 13 are disposed guide rollers 36 and 37 for guiding the photosensitive base member 11, a rotation shaft 39 on which is mounted a supply drum 38 around which the photosensitive base member 11 are wound, and a rotation shaft 41 on which is mounted a take-up drum 40 for winding up the photosensitive base member 11. A brake means, not shown, is connected to the rotation shaft 39 for the supply drum 38 and an electric motor, not shown, is connected to the rotation shaft 41 for the take-up drum 40 through a reduction mechanism. According to this construction, the photosensitive base member 11 can be fed by a predetermined length.

As described above, the vacuum contact printing device according to the first embodiment of the present invention is composed of the paired frame members 13 and 13, the paired transparent plates 20 and 20, the vacuum device 23 and the paired lighting sources 22 and 22. An original contact device, which is described in detail hereinafter as second and third embodiments of the present invention, is composed of the paired frame members 13 and 13, the paired transparent plates 20 and 20 and the vacuum device 23.

Basic Operation

A printing process for printing a picture image formed on an original on a photosensitive base member by utilizing the vacuum contact printing device of the construction described above will be described hereunder.

First, the supply drum 38 on which the photosensitive base member 11 is wound up and the take-up drum 40 are secured to the corresponding rotation shafts 39 and 41 with the frame members 13 and 13 being opened. Then, the photosensitive base member 11 is drawn off from the supply drum 38 and wound up around the take-up drum 40, in a stretched state, through the frame members 13 and 13 by means of the guide roller 36 and then the guide roller 37.

After the setting of the photosensitive base member 11 in the stretched state, the frame members 13 and 13 are closed so that, as shown in FIG. 1, a pair of originals 12 and 12 are supported to predetermined positions determined by the upper and lower spacers 17. At this time, the peripheral edge of the first vacuum chamber 16 defined by the paired originals 12 and 12 is closed by the mutual contact of the packings 15 and 15 and the contact between the packing 15 and the photosensitive base member 11.

Next, the vacuum sucking operation is effected simultaneously through the vacuum ducts 24 and 26 to thereby reduce the pressure in the first and second vacuum chambers 16 and 19, 19 for creating substantially the vacuum condition therein. During this operation, atmospheric pressure acts on the outer surfaces of the transparent plates 20 and 20 as shown by arrows in FIG. 1, but does not act on the outer surfaces of the originals 12 and 12 because of the existence of the second vacuum chambers 19 and 19. Accordingly, the originals 12 and 12 are not immediately pressed to the photosensitive base member 11 and the air existing in a space between the originals 12 and the base member 11 can be quickly exhausted.

After the degree of vacuum, i.e. degree of pressure reduction in the first and second vacuum chambers 16 and 19, 19 have reached to predetermined values, the vacuum condition in the second vacuum chambers 19 and 19 is released with the vacuum condition of the first vacuum chamber 16 being maintained, whereby the inner pressure of the second vacuum chambers 19 and 19 is increased and pressure is accordingly applied to the outer surfaces of the originals 12 and 12 as shown by arrows in FIG. 1 to thereby closely contact the originals 12 and 12 to the entire surface of the photosensitive base member 11. After the inner pressure of the second vacuum chambers 19 and 19 becomes equivalent to the atmospheric pressure, the lighting sources 22 and 22 are lightened, thus performing the exposure through the transparent plates 20 and 20.

In the next step, the vacuum condition in the first vacuum chamber 16 is released, the frame members 13 and 13 secured to the originals 12 and 12 are opened, and the take-up drum 41 is rotated to wind up the photosensitive base member 11 by the predetermined length. The photosensitive base member 11 is then fed between the originals 12 and 12 by the predetermined length for the next exposure. The frame members 13 and 13 are thereafter again closed. These operations are continuously performed to carry out the continuous contact printing process.

As described above, when the interiors of the first and second vacuum chambers 16 and 19, 19 are sucked simultaneously to create the predetermined degree of vacuum, the air in the spaces between the originals 12 and 12 and the photosensitive base member 11 is also sucked, thus the air is not locally sealed in the spaces and the originals 12 and 12 can be firmly contacted to the photosensitive base member 11 by breaking the vacuum condition in the second vacuum chambers 19 and 19 and applying the atmospheric pressure to the outer surfaces of the originals 12 and 12. Accordingly, the time for achieving the desired contact condition is mainly determined by the time required to exhaust the air in the first and second vacuum chambers to the desired vacuum condition. Since this time is basically determined by the ability of the vacuum pump, the capacities of the first and second vacuum chambers and the resistance of the vacuum ducts, this time can be shortened by increasing the exhaust performance of the vacuum pump and enlarging the diameters of the vacuum ducts.

Regarding the vacuum condition of the second vacuum chambers 19 and 19, it may be possible to create the vacuum condition with a time delay of about 1 to 2 seconds in comparison with the first vacuum chamber 16. This time delay for creating the vacuum condition makes it possible to surely prevent the original from being damaged by the suction of the original 12 towards the second chamber side.

On the contrary, according to the conventional device of the characters described herein first, the peripheral edges of the originals are first closely contacted to the photosensitive base member and, accordingly, the air enclosed inside is hardly exhausted outward, so that the operation time cannot be desirably shortened even if a vacuum pump having a large pumping ability is utilized.

Figure 4:
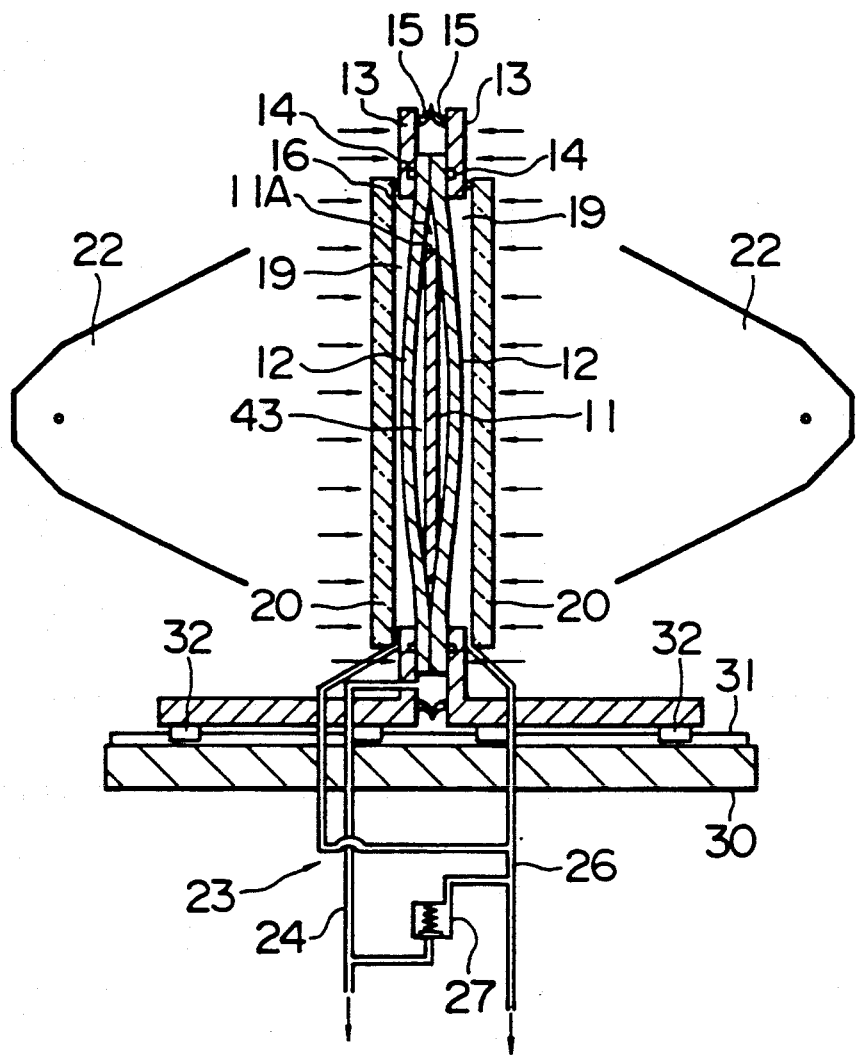
FIG. 4 is a view similar to that of FIG. 1, in which a spacer is not disposed.

Furthermore, in the described first embodiment, the spacers 17 are disposed between the paired originals 12 and 12. These spacers 17 are not always necessary, but the following advantageous effects may be attained by the location of these spacers 17. Namely, when the frame members 13 and 13 are closed and the vacuum chambers 16 and 19, 19 are vacuum sucked, the location of the spacers 17 makes it possible to constantly maintain the space between the originals 12 and 12 and the originals are not closely contacted to the photosensitive base member 11 even when atmospheric pressure acts on the outer surfaces of the frame members 13 and 13 and the transparent plates 20 and 20 as shown in FIG. 1. Accordingly, the air between the originals and the photosensitive base member can be quickly exhausted. Moreover, since only a small gap exists therebetween a good contact condition can be achieved even if the vacuum degrees in the vacuum chambers 16 and 19 are relatively small. On the other hand, in case of no spacer 17, when the first and second vacuum chambers 16 and 19, 19 are vacuum sucked, as shown in FIG. 4, the paired frame members 13 and 13 are pressed inwardly by the atmospheric pressure and the originals 12 and 12 abut against the end 11A of the photosensitive base member 11, thus causing a large gap 43 at a portion near the central portion thereof. For this reason, the air sucking time of the air in the gap 43 is delayed slightly. In addition, in a case where such a large gap is formed, when a relative amount of air remains in the first vacuum chamber 16 because of inadequate vacuum sucking operation, the remaining air in the gap 43 may be crushed at a time when the inner pressure in the second vacuum chambers 19 and 19 returns to the atmospheric pressure and the originals 12 and 12 are closely contacted to the photosensitive base member 11. This may result in the increasing of the inner pressure of the first vacuum chamber 16, thus causing an inadequate contact condition. In view of this, on the contrary, in a case where the spacers 17 are located, as shown in FIG. 1, the originals 12 and 12 never contact the end of the photosensitive base member 11. Therefore, the originals are not flexed, and since the gap between the originals 12 and 12 and the photosensitive base member 11 is small, thus hardly causing an inadequate contact condition even if the vacuum operation is not completed and small amount of air remains. In other wards, the desired contact condition can be obtained with not so high a vacuum degree in the first vacuum chamber 16 by the location of the spacers 17. In an experiment, with the location of the spacers 17, a sufficient close contact condition of the originals can be attained by returning the inner pressure of the second vacuum chambers to the atmospheric pressure at a time when the vacuum degree in the first and second vacuum chambers are made to about a value more than −680 mmHg.

Effects

As described hereinabove, according to the vacuum contact printing device according to the present invention, the second vacuum chambers 19 and 19 are formed by disposing the transparent plates 20 and 20 outside the first vacuum chamber 16 formed between the originals 12 and 12, and the first and second vacuum chambers are both vacuum sucked. Accordingly, when the photosensitive base member 11 is disposed between the paired originals 12 and 12 and closely contacted to them, the interiors of the first vacuum chamber 16 disposed between the originals 12 and 12 and of the second vacuum chambers 19 and 19 formed outside the first vacuum chamber are simultaneously sucked and the vacuum condition of the first vacuum chamber 16 is thereafter released, thus achieving a good contact condition of the originals 12 and 12 with respect to the photosensitive base member 11, whereby there is no need of the surface coarsing treatment to the originals 12 and the photosensitive base member 11, thus effectively contacting the originals to the base member in an extremely short time.

As shown in the illustrated embodiment, the location of the spacers 17, each having a thickness slightly larger than that of the photosensitive base member 11, between the paired originals 12 and 12 prevents the originals from being deformed by being pressed against the end of the photosensitive base member 11 at the vacuum sucking operation for the first and second vacuum chambers 16 and 19, 19. Moreover, the air in the space between the originals and the photosensitive base member can be smoothly and quickly exhausted. In addition, there is substantially no gap therebetween, and defective contact can be more surely prevented.

The check valve 27 is disposed between the first and second ducts 24 and 26 for sucking the air in the first and second chambers 16 and 19 so as to allow air to flow from the first vacuum chamber 16 towards the second vacuum chambers 19 and 19 but to prohibit the reverse flow. The location of the check valve 27 makes it possible to prevent the inner pressure of the second vacuum chambers 19 and 19 from increasing and to prevent the original from being damaged by being pressed on the side of the second vacuum chamber 19 even if the inner pressure of the first vacuum chamber 16 is increased to a value more than that of the second vacuum chambers 19.

Figure 17:
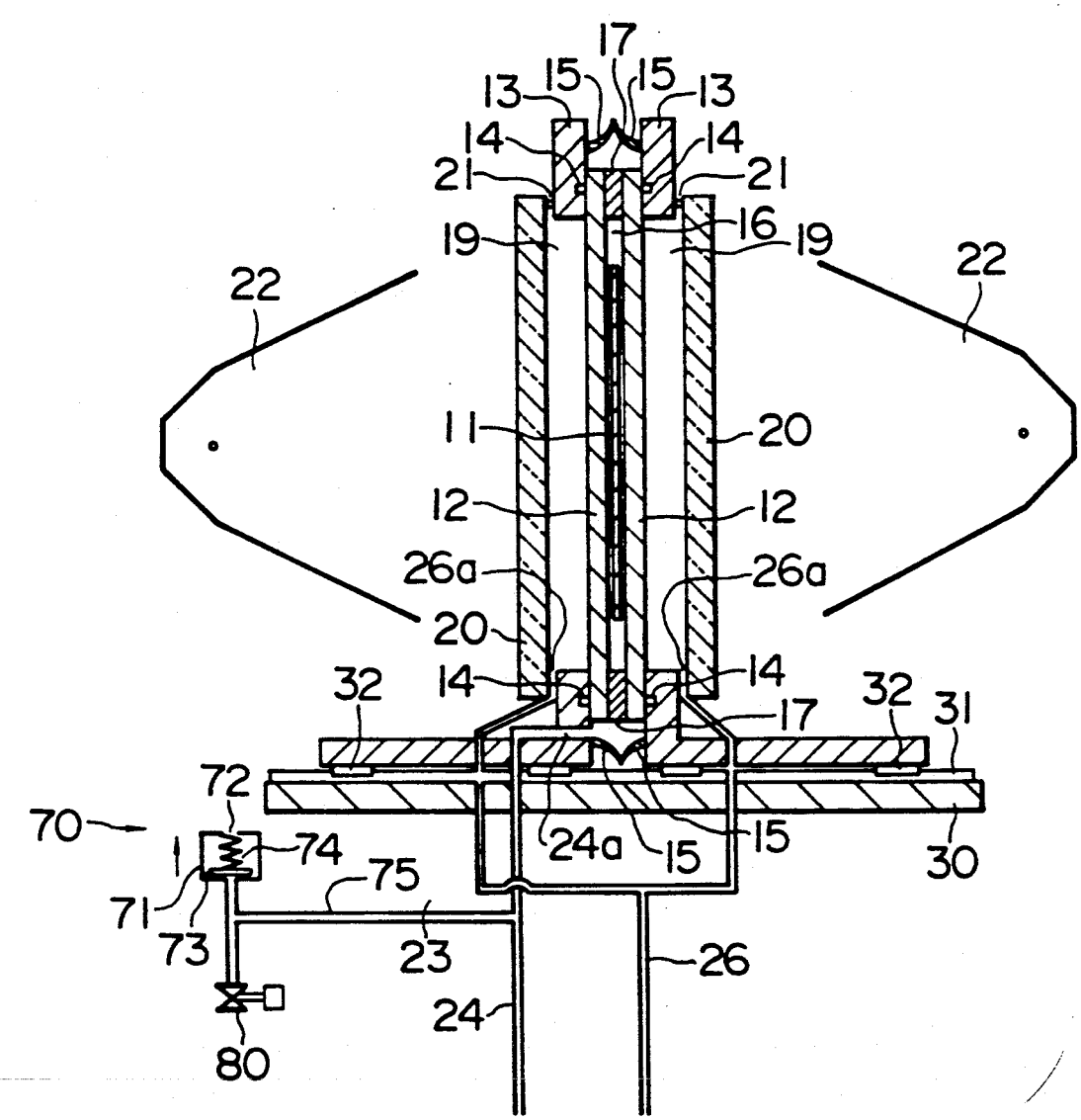
FIG. 17 is a view similar to that of FIG. 1, in which the vacuum contact printing device is equipped with a valve for releasing compressed air between the originals.

However, as shown in FIG. 17, in a case where the originals 12 and 12 are moved towards the photosensitive base member 11 to be closely contacted to both the side surfaces thereof by moving the paired frame members 13 and 13 on the bed 30 in a direction towards the base member 11, the second vacuum chamber 19 is formed in a sealing manner by means of the packings 5 and 15 between the frame members 13 and 13, and the vacuum sucking operation is thereafter carried out, the second vacuum chamber 19 is first defined by the contact of the packings 15 and 15. In this state, the originals 12 and 12 have not been closely contacted to the photosensitive base member 11, and accordingly, the frame members 13 and 13 are further moved towards the base member 11 till they are closely contacted thereto. During this process, since a small gap exists between the frame members 13 and 13, the air existing between the originals 12 and 12 is compressed. In view of this fact, as shown in FIG. 17, to the vacuum duct 24 is secured a branch pipe 75 having one end at which a check valve 70 is disposed, and this check valve 70 acts to allow the compressed air in the gap between the originals 12 and 12 to escape. In such a case, the creation of a vacuum condition in the second vacuum chamber 19 can be more quickly performed. The check valve 70 comprises a box member 71 made of an acryl material and having an opening 72, an acrylic plate 73 disposed to a portion closing the branch pipe 75 and a spring 74 for urging the acrylic plate 73. It may be possible to commonly utilize the check valve 70 and an electromagnetic valve 80 or either one of them may be utilized.

Other Embodiments

Another Embodiment 1

Figure 5:
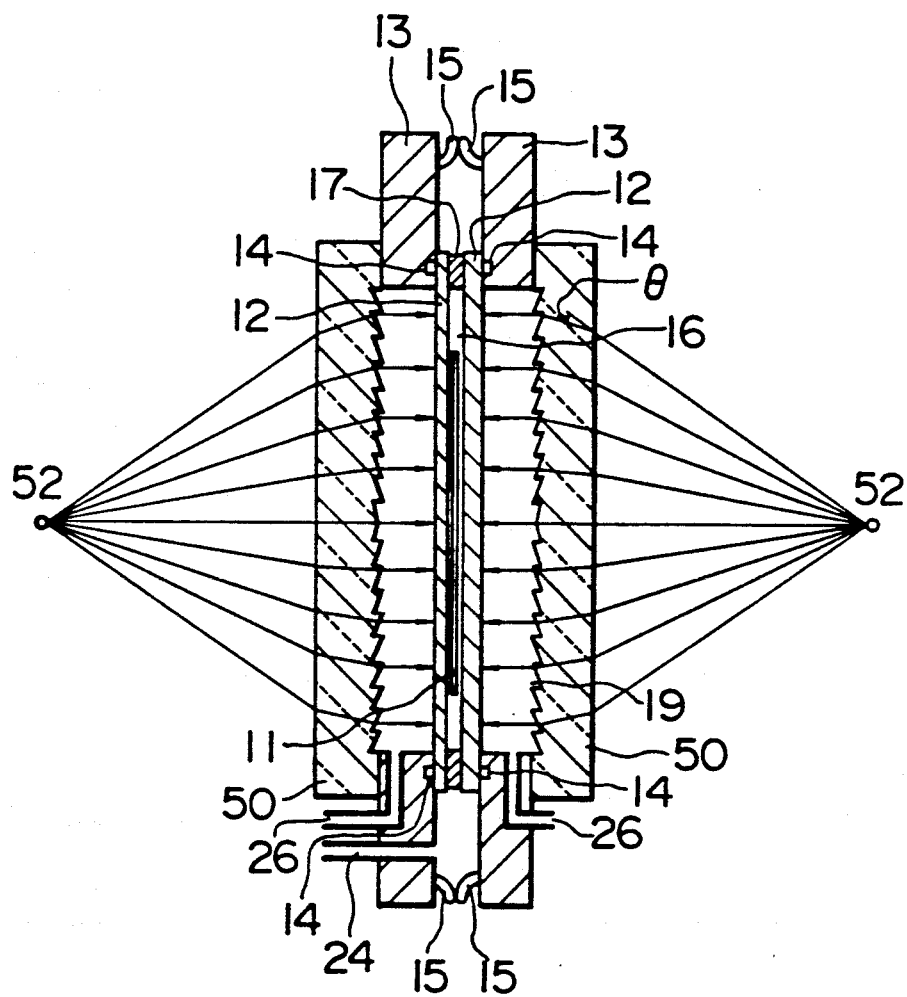
FIG. 5 is a schematic elevational section of another embodiment of a vacuum contact printing device according to the present invention.

FIG. 5 represents another embodiment of the vacuum contact printing device according to the present invention, in which acrylic fresnel lenses 50 and 50 are disposed for the transparent plates 20 and 20 shown in FIG. 1 and a pair of point lighting sources 52 and 52 are arranged for the lighting source, and the other arrangement and location of the members or elements are substantially equal to those of the embodiment shown in FIG. 1.

According to the embodiment of FIG. 5, the light emitted from the point lighting sources 52 and 52 enters the fresnel lenses 50 and 50, are then reflected by angles of $\theta$, and thereafter irradiated on the originals 12 and 12 as parallel lights. As a general matter, when the exposure is carried out by parallel lights, it has been found from experiment that the images formed on the originals can be printed on the photosensitive base member with high accuracy even in the presence of a gap between the originals and the photosensitive base member. Accordingly, the images on the originals can be precisely printed.

Further Embodiment 2

Figure 6:
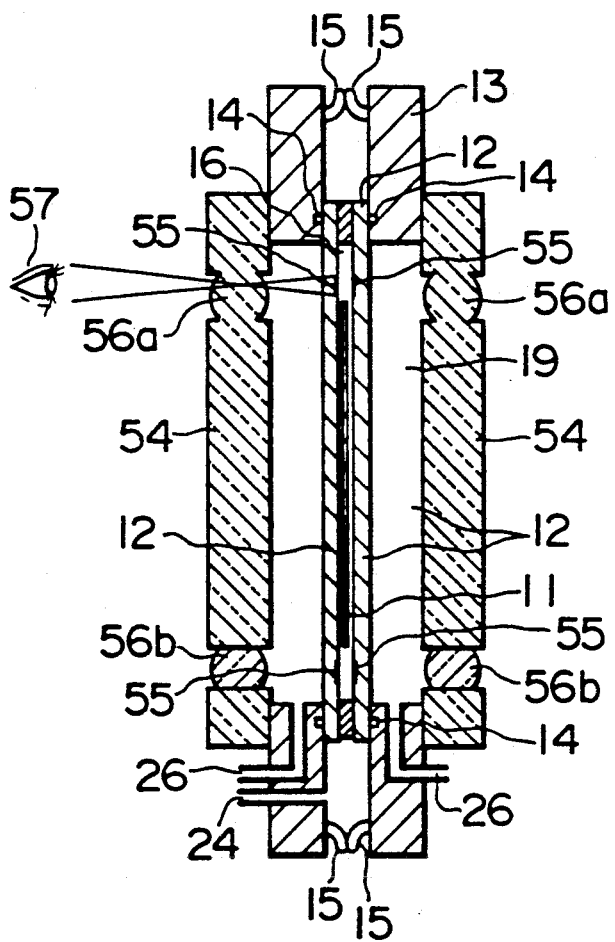
FIG. 6 is a schematic elevational section of a further embodiment of a vacuum contact printing device according to the present invention.

FIG. 6 shows a further embodiment of the vacuum contact printing device according to the present invention, in which lenses 56a and 56b are further provided for a pair of transparent plates 54 and 54 with reference to the vacuum contact printing device of FIG. 1. Namely, register marks 55 and 55 are provided for a pair of originals 12 and 12, respectively, for carrying out the positional resistering of the originals with order of several $\mu$m and, hence, the marks 55 and 55 each has a minute shape. According to the provision of the marks 55 and 55, one of the marks 55 and 55 provided for either one of the lenses 56a and 56b disposed for one of transparent plates 54 and 54 is enlarged so as to be visually observed by an eye 57, thus precisely positioning the originals 12 and 12. The lens 56a or 56b may be composed by working a part of the transparent plate 54 or by a lens separately embedded in the transparent plate 54. The marks 55 and 55 may be observed by a camera instead of the eye 57.

Embodiment of Exposure Apparatus

Basic Structure

An exposure apparatus according to the present invention to which the vacuum contact printing device of the first embodiment has been applied, will be described hereunder.

Figure 7:
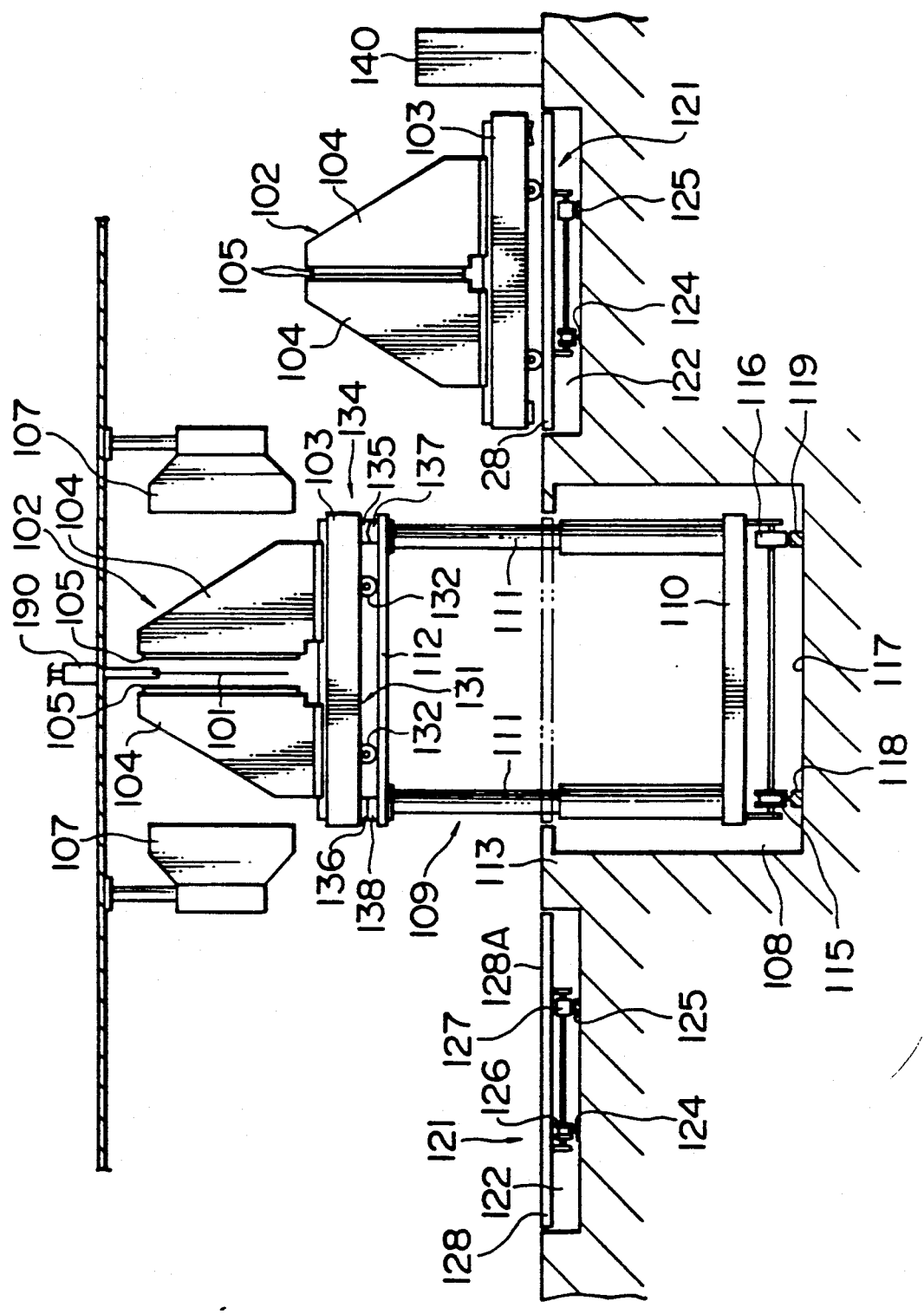
FIG. 7 is a schematic elevational section of one embodiment of an exposure apparatus according to the present invention.
Figure 8:
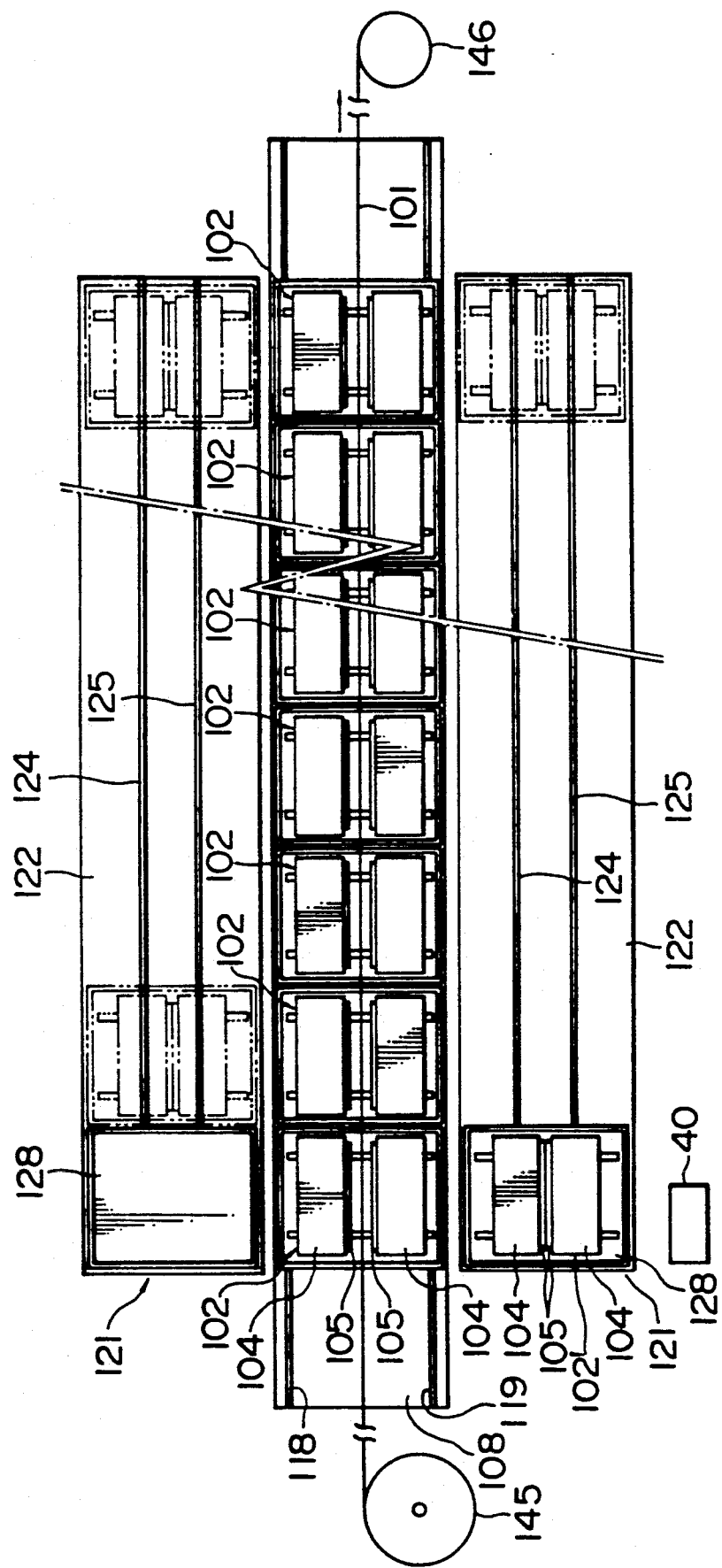
FIG. 8 is a plan view of the exposure apparatus of FIG. 7.

FIG. 7 is a schematic sectional view of the exposure apparatus according to the present invention and FIG. 8 is a plan view thereof. Referring to FIGS. 7 and 8, reference numeral 101 denotes an elongated base member having both surfaces on which a sensitizing agent is coated, and the base member 101 is transferred horizontally intermittently through a predetermined exposure position, with the sensitizing agent coated surfaces being vertical, by a base member conveyor including a supply drum 145 and a take-up drum 146. A plurality of original contact devices 102 are arranged at the exposure positions along the transfer path of the base member 101. Each of the original contact device 102 comprises a base 103, a pair of frame members 104 disposed on the base 103, a pair of originals 105 attached to the frame members 104 so as to face the base member 101, an open-close mechanism, not shown, for opening and closing the frame members 104 so that the originals 105 take positions contacting to the base member 101 and a position apart from the base member 101, and a vacuum contact mechanism, not shown, for vacuum contacting the respective originals 105 to the base member 101.

A plurality of exposure lighting sources 107 are arranged outside the originals 105 of the respective original contact devices 102. The exposure lighting sources 107 are usually secured in a positionally adjustable manner to a ceiling of a room in which the exposure apparatus is installed, but the same may be secured to the original contact devices 102, respectively.

Further referring to the drawings, reference numeral 108 denotes a pit formed to a floor of the room at a portion below the base member 101 to be parallel thereto and reference numeral 109 denotes an elevating mechanism arranged so as to correspond to each of the respective original contact devices 102 so as to support the same, and the elevating mechanism 109 acts to elevate the corresponding original contact device 102 to an exposure position, shown by a solid line in FIG. 1, at which the original 105 faces the base member 101 and an exchanging position below the exposure position. The elevating mechanism 109 is equipped with a bogie 110, hydraulic or air cylinders 111 supported vertically to the bogie 110 and a support table 112 mounted on the upper ends of the cylinders 111. According to this structure, the support table 112 is elevated to a shown upper position and a lower position being substantially flush to the floor surface, shown by a double dot and chain line, at which the original contact device 102 takes its exchanging position. An expansion link mechanism and a combined mechanism of the expansion mechanism and a cylinder means may be utilized as the support table elevating mechanism.

Wheels 115 and 116 are secured to both sides of the bogie 110, and rails 118 and 119, on which the wheels 115 and 116 are rolled, are provided on the bottom surface 117 of the pit in parallel to the traveling direction of the base member 101. The wheels 115 and 116 and the rails 118 and 119 have rigidities sufficient for bearing the weight of the original contact device 102 which is supported on the support table 112 disposed on the bogie 110. It may be desirable to provide a flanged portion for one of the wheels 115 (116) for preventing the wheels from disengaging from the rails. The provision of the flanged portion also prevents the snaking rolling of the wheels along the rails, thus ensuring the positional relationship between the base member 101 and the original contact device 102. The wheels 115 and 116 are connected to an electric motor, not shown, through a speed reduction mechanism and, accordingly, when the motor is driven, the bogie 110 can travel along the rails in a direction substantially parallel to the base member 101. The provision of the mechanism for moving the bogie 110 in a direction parallel to the traveling direction of the base member 101 is based on the adjustment of the pitch of the original contact device 102 so as to accord with the size of the picture pattern to be exposed.

Pits 122 each having a shallow depth are formed to the floor 113 on both sides of the elevating mechanism 109 in parallel to a central pit 108 and rails 124 and 125 are laid on the bottom surfaces of the pits 122, respectively, for supporting a moving device for moving a supplemental original contact device in parallel with the base member 101. The moving device 121 is provided with a bogie 128 equipped with wheels 126 and 127 engaging with the rails 124 and 125.

The bogie 128 is provided with a support surface 128A having a size sufficient for supporting the original contact device 102 and lying in the same level as that of the floor surface 113. The bogie 128 is equipped with a speed reduction mechanism and an electric motor, not shown, to drive the wheels 126 and 127, with the bogie 128 therefore being self-traveling. Accordingly, the bogie 128 can be moved to the side of any one of original contact devices 102 positioned to the exposure position. The rails 124 and 125 and the wheels 126 and 127 have substantially the same structures as those of the rails 118 and 119 and the wheels 115 and 116 for the elevating mechanism 109.

A supplemental original contact device 102' is mounted on one of the bogies 128 arranged on both the sides of the elevating mechanism 109 and the supplemental original contact device 102' has substantially the same structure as that of the original contact device 102 supported by the central elevating mechanism 109.

Each of the original contact device 102 and the supplemental original contact device 102' is equipped with a driving mechanism 131 for horizontally moving the original contact device supported by the elevating mechanism from the upper supporting portion thereof and moving the supplemental original contact device onto the elevating mechanism. The driving mechanism 131 is composed of wheels 132, a speed reduction mechanism and a motor, not shown, for driving the wheels 132. The wheels 132 are not provided with flanged portions so that the wheels can freely travel on the floor. Accordingly, the original contact device 102 can be traveled from the support table 112 of the elevating mechanism 109 onto the floor 113 or the bogie 128 or vice versa. Since only small gaps exist between the support table 112 and the floor 113 and between the floor 113 and the bogie 128, the original contact device 102 can be smoothly transferred.

In a modification, the original contact device driving mechanism for horizontally moving the original contact device from the elevating mechanism and moving the supplemental original contact device onto the elevating mechanism is not limited to that provided for the original contact device itself and the driving mechanism may be independently disposed for moving the original contact device 102 (102') by pushing or pulling the same.

A fastening or fixing mechanism 134 is provided for the original contact device 102 and the elevating mechanism 109 for fixing the original contact device to the predetermined portion on the elevating mechanism. The fixing mechanism 134 comprises a female block 135 and a flat block 136 both disposed below the lower surface of the base of the original contact device 102, a male block 137 and a flat block 138 disposed on the support table 112 of the elevating mechanism 109, and hydraulic or air cylinders for elevating the blocks 137 and 138. When the original contact device 102 is mounted on the support table 112, as shown, the blocks 137 and 138 are engaged with the blocks 135 and 136, respectively, on the side of the original contact device 102 to thereby secure immovably the same. When the original contact device 102 is moved, the fixing mechanism 134 is lowered to a position not disturbing the movement of the original contact device 102. The blocks 137 and 139 are disposed at positions not disturbing the movement of the wheels 132 for the original contact device 102.

Reference numeral 140 denotes a control unit for controlling the elevation of the elevating mechanism 109, the moving operation of the elevating mechanism 109 along the rails 118 and 119, the transferring operation of the original contact device 102 (102') by means of the driving mechanism 131, and the fixing or releasing operation of the fixing mechanism 134. In the control unit 140, programs for carrying out the operations described hereinafter are set, and the starting and finishing of the operations of the respective devices and mechanisms are processed by signals generated from a detector such as photodetector, not shown.

Basic Operation

The exposure apparatus shown in FIGS. 7 and 8 operates in the following manner.

Referring to FIGS. 7 and 8, each of a plurality of elevating mechanism 109 stops at a position at which the original contact device 102 supported by the elevating mechanism 109 is provided with a pitch corresponding to the picture pattern of the original 105 and supports the original contact device 102 at the exposure position, shown in FIG. 1, at which the original 105 faces the base member 101. The base member 101 is intermittently traveled, and at the stopping time of the base member, the original 105 of each of the original contact devices 102 is closely contacted to the base member 101. After the exposure, the original 105 leaves the base member 101, and the base member 101 is then traveled by the predetermined length. These operations are continuously carried out, thus printing a plurality of the originals 105 at one process.

During these operations, the numbers of the exposed times of the respective original contact devices are counted by an exposure counter, not shown, of the controlling unit 140.

Since the supplemental original contact device 102' is mounted on one of the moving devices 121 disposed on both the sides of the main original contact device 102, a new original is set to the selected supplemental original contact device 102' and the originals are then mutually positioned. This operation can be carried out in parallel with the exposing operations without disturbing the exposing operations. Although not shown in the drawings, a lighting source for performing exposure to the supplemental original contact device 102' is arranged to a proper portion for the exposure, as occasion demands, for preliminarily performing the checking of the original and the exposing conditions.

The controlling unit 140 further acts to detect one of the plurality of the original contact devices now in time of the exposing operations at the exposure positions for the next original exchange and the moving devices 121 are then moved to both sides of the original contact device 102 for the next original exchange. In the illustration of FIG. 8, for this purpose, when it is assumed that the original of the left hand original contact device 102 is exchanged, an empty moving device 121 and the moving device on which the supplemental original contact device 102' is mounted are positioned and stopped to the side of the left hand original contact device 102. Such positioning operation can be carried out by photodetectors arranged for the respective positions.

After the required numbers of the exposed times of the original contact devices have been completed, this fact is confirmed by the exposure counter of the control unit 140 and then the support table 112 is lowered to the exchanging position laying on the same level as the floor level 113 by the operation of the elevating mechanism 109. This fact is detected by the photodetector disposed on the surface of the floor level 113. The frame members 104 of the original contact device 102 are then closed and, simultaneously, the lower blocks 137 and 138 of the fixing device 134 are lowered to release the fixing of the original contact device 102. This releasing of the original contact device 102 is detected by a limit switch to thereby operate the wheel driving motor for the original contact device 102. According to this series of operations, the wheels 132 are rotated to horizontally transfer the original contact device onto the empty moving device 121 from the support table 121. The original contact device 102 is stopped to the predetermined position on the empty moving device 121 by the detection of the transfer of the original contact device 102 to that predetermined position.

At substantially the same time, the wheel driving motor of the supplemental original contact device 102' waiting on the contrary side starts to operate and the supplemental original contact device 102' is transferred on the support table 112 of the elevating mechanism 109 by the rotation of the wheels 132. The transfer thereof to the predetermined position is detected by the photodetector disposed to the support table 112 and stopped there. In conformity with this operation, the blocks 137 and 138 are moved upward to fix the original contact device 102' and then open the frame members 104 for the supplemental original contact device 102'. When the limit of the upward movement of the blocks 137 and 138 of the fixing device 134 is detected by the limit switch, the elevating mechanism 109 lifts up the original contact device 102' to a position at which the exposure is carried out.

According to this series operations, the main original contact device 102 utilized for the exposure is exchanged with the supplemental original contact device 102' for the next exposure. The original of the exchanged original contact device 102 is exchanged with a new original and will be utilized for a supplemental original contact device for the next operation.

As described hereinabove, the original contact device 102 utilized for the exposure can be subsequently exchanged with the supplemental original contact device, thus performing the original exchanging operation. Since the exchanging of the main original contact device now used for the exposure can be smoothly and quickly exchanged with the supplemental original contact device, the availability factor of the exposure apparatus is never lowered and the loss of the base member can be substantially prevented.

In the described embodiment, although the moving device 121 on which the supplementary original contact device 102' is mounted and the empty moving device 121 are moved to the side of the original contact device to be exchanged to carry out the exchanging operation, in an alternation, the elevating device 109 may be moved along the traveling direction of the base member 101 and positioned to a position at which the moving device 121 is waiting, to thereby carry out the exchanging operation at that position.

In an alternate embodiment, a plurality of moving devices may be utilized in place of the arrangement of one moving device on the respective side of the base member 101.

Furthermore, in the described embodiment, for the exchanging of the original contact device 102 now at the exposure position, the original contact device 102 has the structure to be lowered below the base member 101 and then horizontally moved, but, in an alternate embodiment, a base member elevating mechanism 190 for elevating the base member 101 may be arranged to elevate the base member 101 by the base member elevating mechanism 190 thereby to move horizontally the original contact device 102 and then to exchange the same. In this alternate embodiment, the original contact device elevating mechanism can be eliminated and the original contact device 102 is directly supported by the bogie 110. In such a case, the exposure lighting source 107 has a structure capable of being moved to a waiting position not disturbing the horizontal movement of the original contact device 102 or capable of being directly supported by the original contact device 102. In addition, a base member elevating mechanism 180 for elevating the base member 101 and an elevating mechanism 111 for elevating the original contact device 102 may be commonly utilized for the described purpose.

Another Embodiment

Figure 9:
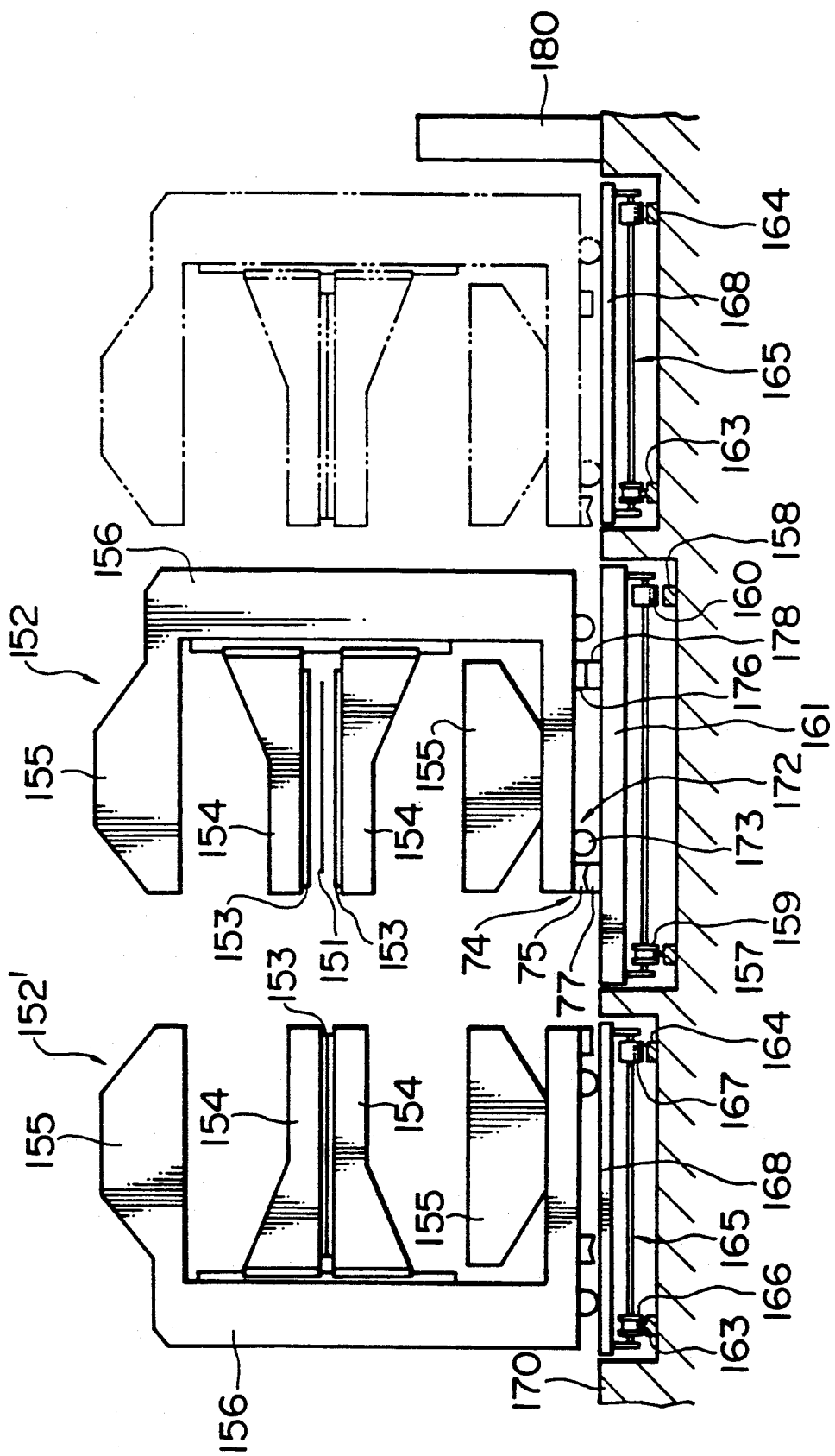
FIG. 9 is a schematic elevational section of another embodiment of an exposure apparatus according to the present invention.

FIG. 9 shows a schematic elevational section of another embodiment of the exposure apparatus according to the present invention, in which a base member 151 is horizontally travelled through the predetermined exposing position by a base member transferring device, not shown, with a surface of the base member on which a photosensitive material is coated being horizontally maintained.

Referring to FIG. 9, a plurality of original contact devices 152 are arranged along the travelling path of the base member 151. Each of the original contact device 152 includes a pair of frame members 154 openable vertically, as viewed, with originals 153 being supported, an exposure lighting sources 155 arranged on the outside thereof and columns 156. In the illustration of FIG. 9, although the original contact devices 152 with the columns 156 on the rightside, substantially the half of the original contact devices 152 is arranged on this side, but another half of the devices 152 are arranged with the columns 156 on the opposite side as is the same with respect to supplemental original contact devices 152', which will be described hereinlater.

Rails 157 and 158 are disposed below the base member 151 in a direction parallel to the travelling direction of the base member 151 and a plurality of bogies 161 provided with wheels 159 and 160 are located on the rails 157 and 158 at positions corresponding to the original contact devices, respectively. These bogies 161 are also provided with electric motors, not shown, to be self movable.

Rails 163 and 164 are also laid on both the sides of the base member 151 along the travelling direction thereof and moving devices 165 are disposed on the rails so as to be movable. Each of the moving devices 165 is equipped with a bogie 168 provided with wheels 166 and 167 and an electric motor for driving the wheels. These bogies 161 and 168 are commonly disposed on the same level as that of the floor 170. A supplemental original contact device 152' is mounted on the moving device 165 so as to face the side edge of the base member 151 and the supplemental original contact device 152' has a structure substantially the same as that of the original contact device 152 arranged at the exposure position. As shown, the supplemental original contact device 152' of the moving device 165 arranged on the leftside, as viewed, of the base member 151 is provided with the columns 156 arranged leftside and the supplemental original contact device 152' arranged on the rightside is provided with the columns arranged rightside thereof.

The original contact device 152 and the supplemental original contact device 152' are both equipped with original contact device driving mechanisms 172 for horizontally transferring the original contact device 152 from the exposure position and transferring the supplemental original contact device 152' to the exposure position, respectively. Each original contact device driving mechanism 172 comprises wheels 173, an electric motor for driving the same and a speed reduction means, not shown. A fixing device 174 for fixing the original contact device 152 is further disposed on the bogie 161. The fixing device 174 has a structure substantially the same as that shown in FIG. 7 and is provided with a female block 175 and a flat block 176 both disposed below the original contact device 152 and a male block 177 and a flat block 178 both provided for the bogie 161. The fixing device 174 is also provided with a hydraulic or air cylinder assembly for elevating the blocks 177 and 178. The exposure apparatus of FIG. 9 is also equipped with a controlling unit 180 for controlling the operation of the exposure apparatus.

The exposure apparatus of FIG. 9 operates in accordance with the following manner.

First, an empty moving device 165 and a moving device on which the supplemental original contact device 152' is mounted are moved on bilateral sides of the original contact device 152 which is to be exchanged and then stopped there. As shown, in case of the original contact device to be exchanged with the columns 156 righthand thereof, the supplemental original contact device 152' provided with the lefthand columns is supported by the lefthand moving device 165. When the original contact devices are stopped at the bilateral predetermined positions, the fixing device 174 is released and the original contact device 152 is moved onto the righthand moving device 165 by the driving mechanism 172.

In the next step, the supplemental original contact device 152' mounted on the lefthand moving device 165 is then moved on the central bogie 161 by the driving mechanism 172 and fixed to the predetermined position by the fixing device 174, thus completing the original contact device exchanging operation. The original contact device 152 transferred on the righthand moving device 165 is handled thereafter as a supplemental original contact device 152' and, after the exchanging of a new original, will be exchanged with an original contact device 152, disposed at the exposure position, having the columns 156 on the leftside for the next use.

Effects

As described above, according to the exposure apparatus of the present invention, a supplemental original contact device is arranged in addition to the original contact devices arranged at the exposure positions along the travelling direction of the base member and the original contact device at the exposure position is substituted with the supplemental original contact device, whereby a new original is set and positioned to the supplemental original contact device during the ordinary exposing time for the original contact device arranged at the exposure position, thus remarkably saving the exchanging time. In addition, in the case of the exchanging of the original of the original contact device now in use, the original contact device is removed from the exposure position and easily substituted with the supplemental original contact device, thus also saving the operation time.

Furthermore, the original and the exposing conditions can be easily done by preliminarily constructing the supplemental original contact device, after the completion of the positioning of the original, so as to be exposed, thus being convenient.

Embodiment of Original Contact Device

Basic Structure

Figure 10:
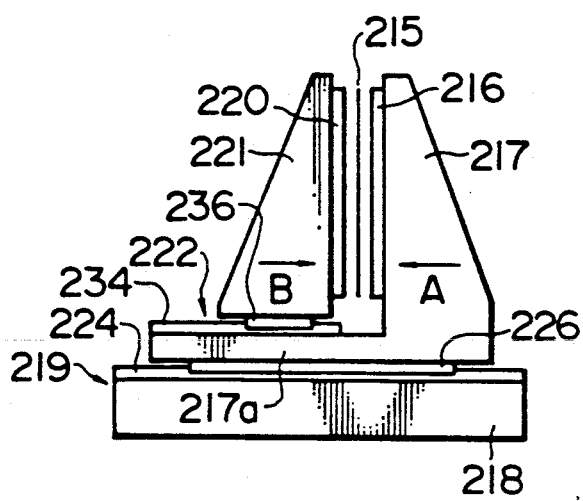
FIG. 10 is a side view of a original contact device according to the present invention.
Figure 11:
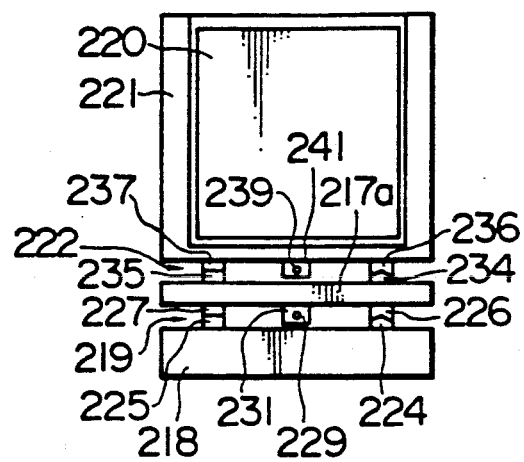
FIG. 11 is a front view of the original contact device of FIG. 10.
Figure 12:
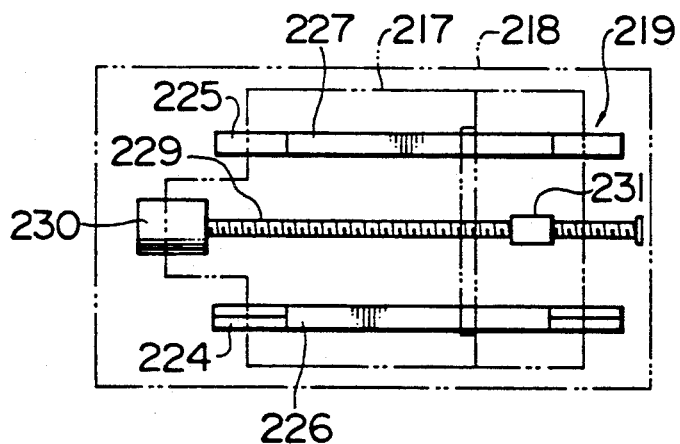
FIG. 12 is a plan view showing a mechanism for driving a first slide mechanism and a first frame member of the original contact device of FIG. 10.
Figure 13:
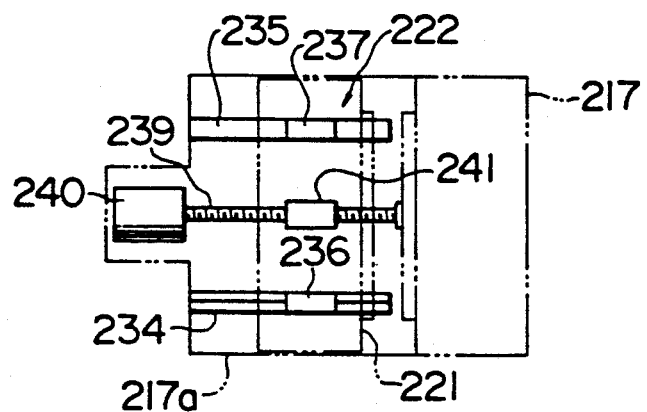
FIG. 13 is a plan view showing a mechanism for driving a second slide mechanism and a second frame member of the original contact device of FIG. 10.
Figure 14:
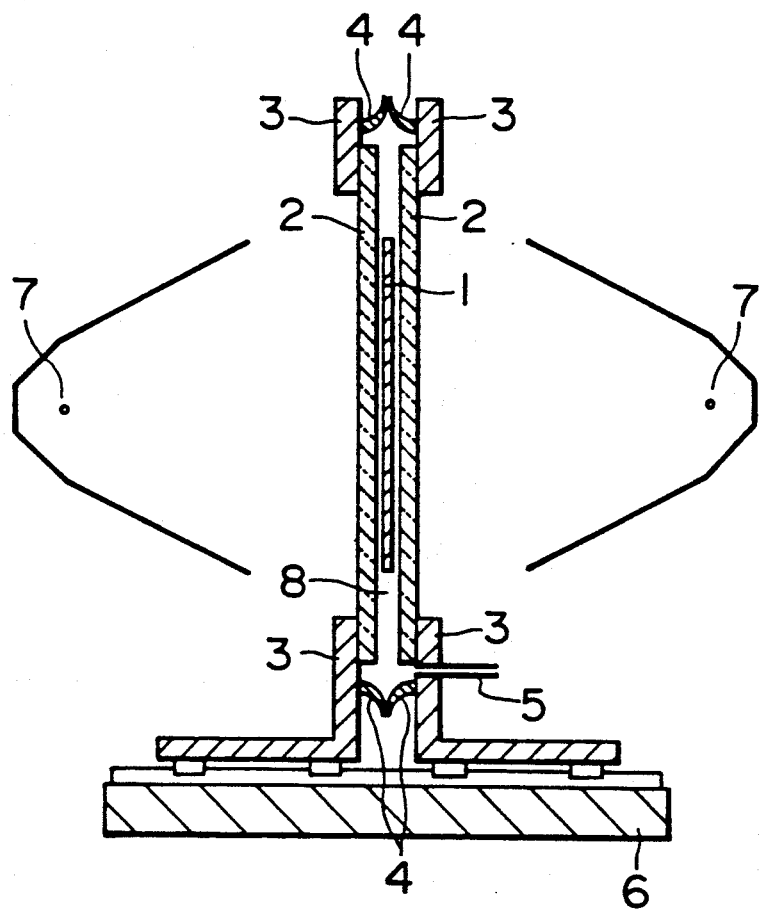
FIG. 14 is a schematic sectional view of a conventional vacuum contact printing device.
Figure 15:
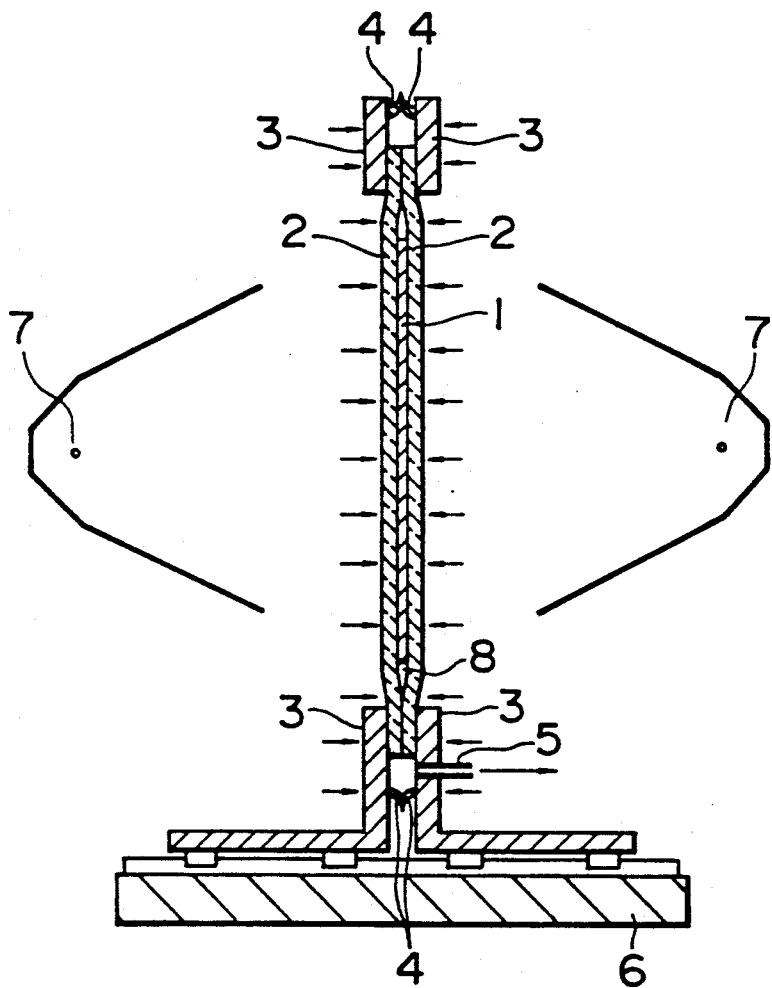
FIG. 15 is a schematic sectional view showing a condition in which originals are closely contacted to a photosensitive base member of the vacuum contact printing device of FIG. 14.
Figure 16:
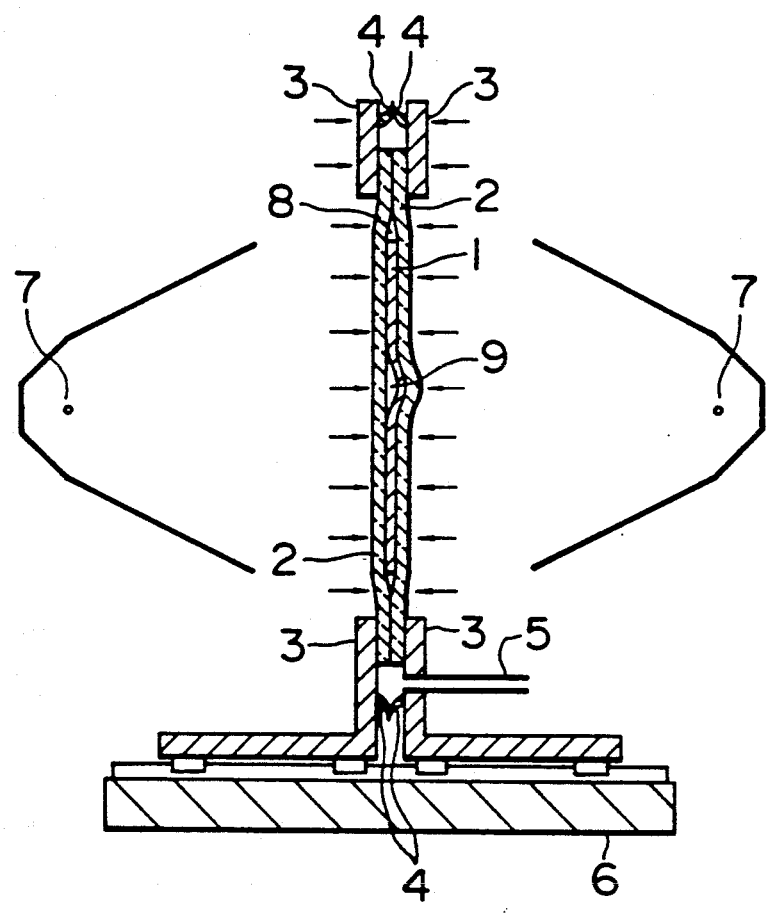
FIG. 16 is a schematic sectional view for the explanatory of the problem of the vacuum contact printing device of FIG. 14.

One embodiment of an original contact device to be utilized for the exposure apparatus of the type described with reference to the former embodiment is described hereunder in conjunction with FIGS. 10 to 13, in which FIG. 10 is a side view of the original contact device according to the present embodiment, FIG. 11 is a front view thereof, FIG. 12 is a plan view showing a mechanism for driving a first slide mechanism and a first frame member and FIG. 13 is a plan view showing a mechanism for driving a second slide mechanism and a second frame member.

Referring to FIG. 10, reference numeral 215 denotes a base member to be exposed on which a photosensitive material is coated, and the base member 215 is fed to a position shown in FIG. 10 by a suitable means, not shown. On one side of the base member 215 is arranged a first original 216 on which a picture pattern is described and the first original 216 is supported by a first frame member 217 having a lower end portion constituted as a support table 217a extending horizontally. Reference numeral 218 denotes a base table on which is mounted a first slide mechanism 219 for supporting the first frame member 217 to be movable in a direction normal to the travelling direction of the base member 215. On the other side of the base member 215 is arranged a second original 220 on which a picture pattern is described. The second original 220 is supported by a second frame member 221, and reference numeral 222 denotes a second slide mechanism for supporting the second frame member 221 to be movable in a direction normal to the travelling direction of the base member 215.

The first slide mechanism 219 comprises, as shown in FIG. 12, two rails 224 and 225 disposed in parallel to the base table 218 and rail followers 226 and 227 secured to the first frame member 217 and engaged with these rails 224 and 225 to be slidable. These rails 224 and 225 have different shapes with each other for the purpose of increasing the positional performance. Namely, as shown in FIG. 11, one 224 of the rails has an angled shape and one 226 of the followers sliding on the rail 224 has a root shape corresponding to the angled shape of the rail 224. While, the other one 225 of the rails has a flat shape and the other one 227 of the followers has also the flat shape corresponding to that of the rail 225, thus the follower 227 merely resting on the rail 225. This structure is based on the fact that the degree of parallelization of these two rails 224 and 225 is hard to be realized and for the countermeasure to the thermal expansion of the rails 224, 225, the rail followers 226, 227, the first frame member 217 and the base table 218 during the exposure process.

The base table 218 is equipped with a screw shaft 229 parallel to the rails 224 and 225 and a motor 230 for rotating the screw shaft 229. The first frame member 217 is provided with a screw follower 231 engaging the screw shaft 229. According to these structures, when the motor 230 is driven, the screw follower 231 is moved along the screw shaft 229, thereby linearly moving the first frame member 217.

The second slide mechanism 222 comprises, as is shown in FIG. 13, two rails 234 and 235 both disposed parallel to the support table 217a of the first frame member 217 and rail followers 236 and 237 engaged with these rails 234 and 235 so as to be slidable. These rails 234 and 235 and followers 236 and 237 have substantially the same structure as those of rails 224 and 225 and the followers 236 and 237, respectively.

The support table 217 of the first frame member 217 is further equipped with a screw shaft 239 parallel to the rails 234 and 235 and a motor 240 for rotating the screw shaft 239. The second frame member 221 is provided with a screw follower 241 engaging the screw shaft 239. According to these structures, when the motor 240 is driven, the screw follower 241 is moved along the screw shaft 239, thereby linearly moving the second frame member 221 with respect to the support table 217a of the first frame member 217.

A moving stroke of the second frame member 221 with respect to the support table 217a is set to twice the moving stroke of the base table 218 of the first frame member 217.

Basic Operation

The original opening and closing operation of the original contact device of the characters described above will be explained hereunder.

Now supposing that the originals 216 and 220 are positioned apart, in an opened state, from each other on both the sides of the base member 215 as shown in FIG. 10, when the motor 230 is driven to rotate the screw shaft 229, the screw follower 231 moves along the shaft 229, thereby moving the first frame member 217 secured to the screw follower 231 in an arrowed direction A in FIG. 10. According to the movement of the first frame member 217, the first original 216 moves to the position closely contacting to one side of the base member 215. In parallel with this operation, when the motor 240 is driven to rotate the screw shaft 239 in a direction reverse to the screw shaft 229, the screw follower 241 moves along the screw shaft 239, thereby moving the second frame member 221 secured to the screw follower 241 in an arrowed direction B in FIG. 10. According to the movement of the second frame member 221, the second original 220 moves to a position closely contacting to the other side of the base member 215. The originals 216 and 220 thus take the closed positions through these operations, and the originals 216 and 220 take the opened positions through operations reverse, in order, to those described above.

Since the second frame member 221 supporting the second original 220 is supported by the support table 217a as a part of the first frame member 217 through the second slide mechanism 222, the relative positional performance between the originals 216 and 220 closely contacting to the base member 215 can be determined only by the performance of the second slide mechanism 222 and is not influenced by the first slide mechanism 219 supporting the first frame member 217, thus extremely reducing the positional shift between the originals 216 and 220.

Effects

As described hereinabove, according to the original contact device of this embodiment, the second frame member supporting the second original is supported through the second slide mechanism with respect to the first frame member supporting the first original, so that the relative positional performance between the first and second originals can be highly improved, thus substantially eliminating the attaching position adjustment with respect to one of the originals.

What is claimed is:

1. A vacuum contact printing device comprising:
   a pair of frame members which support originals at both sides of a base member having both surfaces coated with a photosensitive material and which define a first vacuum chamber between said originals;
   transparent plate members supported by said frame members and disposed so as to define second vacuum chambers between the transparent plate members and the originals on both sides of the base member;
   vacuum means for exhausting air in said first and second vacuum chambers to substantially reduce inner pressure thereof and releasing a vacuum condition in at least said second vacuum chambers; and
   lighting means arranged outside said plate members for irradiating an exposure light.

2. The vacuum contact printing device according to claim 1, wherein a spacer means is disposed between originals supported by said frame members respectively.

3. The vacuum contact printing device according to claim 1, wherein said vacuum means comprises a first vacuum duct communicating with the first vacuum chamber, a second vacuum duct communicating the second vacuum chambers and a check valve disposed between said first and second vacuum ducts so as to allow air flow from the first vacuum chamber to the second vacuum chamber and prohibit reverse air flow.

4. The vacuum contact printing device according to claim 1, wherein said exposure lighting source irradiates an exposure light having a wavelength at least ranged in a wavelength area of an ultraviolet ray and wherein said transparent plate members is each composed of a resin plate having an ultraviolet ray absorption property.

5. The vacuum contact printing device according to claim 1, wherein said exposure lighting source comprises a metal halide lamp and wherein said transparent plate member is each composed of a resin plate having an ultraviolet ray absorption property.

6. The vacuum contact printing device according to claim 5, wherein said metal halide lamp is filled up with iridium.

7. The vacuum contact printing device according to claim 1, wherein each of said transparent plate members is composed of a fresnel lens.

8. The vacuum contact printing device according to claim 1, wherein said originals are provided with register marks and a lens means is provided for at least one of said transparent plate members for observing said register marks from outside to thereby register positions of the originals.

9. The vacuum contact printing device according to claim 8, wherein said lens means is formed by working a portion of said transparent plate member.

10. The vacuum contact device according to claim 8, wherein said lens means is embedded as an independent means in said transparent plate member.

11. The vacuum contact printing device according to claim 1, wherein an exhaust valve means is further located so as to communicate with said first vacuum chamber to exhaust outward an compressed air.

12. The vacuum contact printing device according to claim 11, wherein said valve means is a check valve.

13. The vacuum contact printing device according to claim 11, wherein said valve means is an electromagnetic valve.

14. An exposure apparatus comprising:
transferring means for transferring an elongated base member having both surfaces coated with a photosensitive material through a predetermined exposure position;
a plurality of original contact devices arranged along a transferring path of the base member so as to closely contact originals on which picture patterns are described to both surfaces of said base member;
exposure lighting means disposed outside said originals; and
a supplemental original contact device arranged at a portion apart from the exposure position;
said original contact devices being constructed to be movable from the exposure positions to other positions and said supplemental original contact device being constructed to be movable to the exposure position from other position.

15. An exposure apparatus comprising:
transferring means for transferring an elongated base member having both surface coated with a photosensitive material through a predetermined exposure position with the coated surface being horizontally maintained;
a plurality of original contact devices arranged along a transferring path of the base member so as to closely contact originals on which picture patterns are described to both surfaces of said base member;
exposure lighting means disposed outside of said originals;
elevation means for supporting said original contact devices respectively and elevating the original contact devices to the exposure positions and original exchanging position below the exposure positions;
a supplemental original contact device arranged at a waiting position beside the exchanging position;
driving means for horizontally moving said original contact devices supported by said elevation means from the elevation means and moving said supplemental original contact device onto the elevation means; and
fixing means for fixing said original contact device to a predetermined position on said elevation means.

16. The exposure apparatus according to claim 15, further comprising a moving means disposed on both sides of said elevation means for moving said supplemental original contact device in a direction parallel to said base member.

17. The exposure apparatus according to claim 15, further comprising an elevation mechanism for elevating the base member to the exposure position and an escape position higher than the exposure position.

18. An exposure apparatus comprising:
transferring means for horizontally transferring an elongated base member having both surface coated with a photosensitive material through a predetermined exposure position with the coated surface being vertically maintained;
a plurality of original contact devices arranged along a transferring path of the base member so as to closely contact originals on which picture patterns are described to both surfaces of said base member;
exposure lighting means disposed outside of said originals;
elevation means for elevating said base member to the exposure position and a waiting position higher than the exposure position;
supplemental original contact device arranged adjacent to the original contact devices arranged along the base member;
driving means for horizontally moving said original contact devices from the exposure position and moving said supplemental original contact device to the exposure position; and
fixing means for fixing said original contact device to the exposure position.

19. The exposure apparatus according to claim 18, further comprising a moving means disposed on both sides of said original contact device positioned at an operating position for moving said supplemental original contact device in a direction parallel to the base member.

20. An exposure apparatus comprising:
transferring means for horizontally transferring an elongated base member having both surface coated with a photosensitive material through a predetermined exposure position with the coated surface being horizontally maintained;
a plurality of original contact devices arranged along a transferring path of the base member so as to closely contact originals on which picture patterns are described to both surfaces of said base member;
exposure lighting means disposed outside said originals;
a supplemental original contact device arranged at a portion apart from the exposure position facing side edge of said base member;
driving means for horizontally moving said original contact devices from the exposure positions and moving said supplemental original contact device to the exposure position;
fixing means for fixing said original contact device to the exposure position; and
moving means arranged on both sides of said base member positioned at the exposure position for moving said supplemental original contact device in a direction parallel to said base member.

21. An original contact device comprising:
a first frame member disposed on one side of a base member having both surfaces coated with a photosensitive material for supporting a first original;
first slide means for supporting said first frame member to be movable in a direction normal to said base member;
second frame member disposed on another side of the base member for supporting a second original; and
a second slide means supported by said first frame member for supporting said second frame member to be movable in a direction normal to said base member.

22. A vacuum printing method comprising the steps of:
preparing a base member having both surfaces coated with a photosensitive material and a pair of originals;
arranging said originals on both sides of said base member so as to define a first vacuum chamber between said base member and said originals;

arranging a pair of transparent plates outside said originals so as to define second vacuum chambers between said originals and said transparent plates;
exhausting inner airs in said first and second vacuum chambers to reduce inner pressure thereof;
releasing a vacuum condition only in said second vacuum chambers to closely contact the originals to the base member; and
irradiating an exposure light towards said transparent plates from outside the same.

* * * * *